United States Patent
Schumm et al.

(10) Patent No.: US 8,096,612 B2
(45) Date of Patent: Jan. 17, 2012

(54) SEAT SYSTEM FOR PASSENGER VEHICLES

(75) Inventors: Klaus Schumm, Schwäbisch Hall (DE); Gerhard Klein, Schwäbisch Hall (DE); Branislav Miskovic, Schwäbisch Hall (DE); Oliver Schwarz, Schwäbisch Hall (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 550 days.

(21) Appl. No.: 12/225,797

(22) PCT Filed: Feb. 2, 2007

(86) PCT No.: PCT/EP2007/000894
§ 371 (c)(1), (2), (4) Date: Dec. 9, 2008

(87) PCT Pub. No.: WO2007/118534
PCT Pub. Date: Oct. 25, 2007

(65) Prior Publication Data
US 2011/0156452 A1 Jun. 30, 2011

(30) Foreign Application Priority Data
Apr. 1, 2006 (DE) .................. 10 2006 015 180

(51) Int. Cl.
*B60N 2/32* (2006.01)
(52) U.S. Cl. ................ 297/146; 297/125
(58) Field of Classification Search .......... 297/112, 297/113, 115, 117, 125, 126, 145, 146, 155, 297/162
See application file for complete search history.

(56) References Cited

U.S. PATENT DOCUMENTS

| | | | | |
|---|---|---|---|---|
| 1,869,444 A | * | 8/1932 | Tobey | 297/145 |
| 3,145,052 A | * | 8/1964 | Morgan | 297/354.1 |
| 3,374,032 A | * | 3/1968 | Del Giudice | 297/394 |
| 3,506,304 A | | 4/1970 | Smittle et al. | |
| 3,910,632 A | * | 10/1975 | Marechal | 297/232 |
| 4,533,175 A | | 8/1985 | Brennan | |
| 5,037,157 A | * | 8/1991 | Wain et al. | 297/188.18 |
| 5,516,191 A | * | 5/1996 | McKee | 297/188.15 |
| 6,793,282 B2 | * | 9/2004 | Plant et al. | 297/248 |
| 7,261,369 B2 | * | 8/2007 | Ahad | 297/148 |
| 7,770,966 B2 | * | 8/2010 | Johnson | 297/122 |
| 2004/0046430 A1 | | 3/2004 | Plant et al. | |
| 2005/0184566 A1 | * | 8/2005 | Baumann et al. | 297/248 |

FOREIGN PATENT DOCUMENTS

| | | |
|---|---|---|
| EP | 0 530 920 A1 | 3/1993 |
| FR | 2 841 510 A1 | 1/2004 |
| WO | WO 2005/061322 A | 7/2005 |

* cited by examiner

Primary Examiner — Peter R. Brown
(74) Attorney, Agent, or Firm — Posz Law Group, PLC

(57) ABSTRACT

A releasing device for a table part of a seat system for passenger vehicles. In a releasing device for a table part of a seat system for passenger vehicles, in particular for aircraft, comprising seat components such as a seat structure, a seat part, a seat back and an armrest, the position of at least one of these seat components being adjustable, wherein the table part is arranged on the seat structure to be tiltable between an operative position and a stowed position, the table part can be secured in the stowed position by means of a locking device which, for releasing the table part into its operative position, can be actuated by the adjustment movement of at least one armrest.

11 Claims, 6 Drawing Sheets

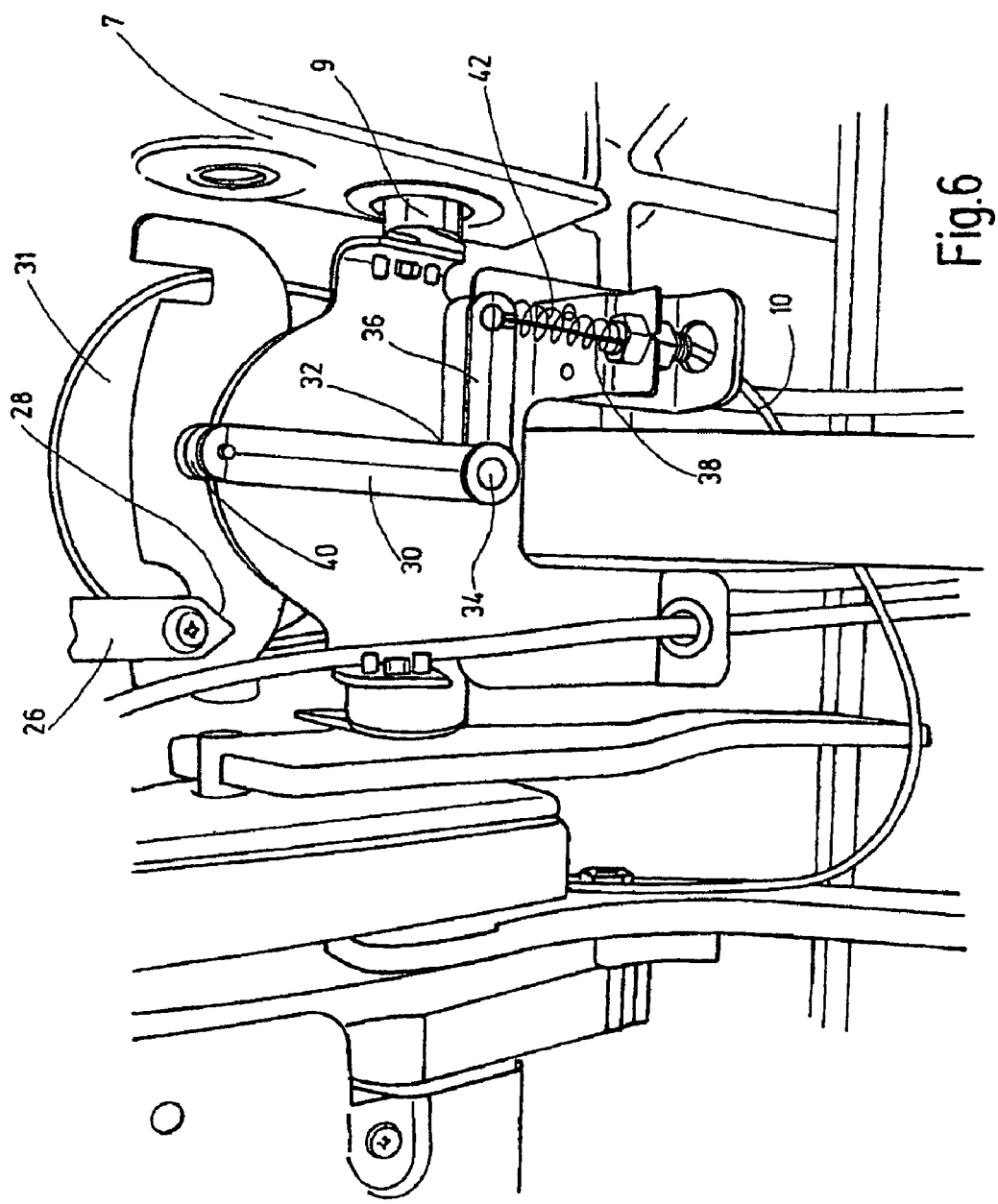

SEAT SYSTEM FOR PASSENGER VEHICLES

CROSS REFERENCE TO RELATED APPLICATIONS

This application is a U.S. national stage application of PCT/EP2007/000894 filed on Feb. 2, 2007, and claims priority to, and incorporates by reference, German Patent Application No. 10 2006 015 180.1 filed on Apr. 1, 2006.

The invention relates to a releasing device for a table part of a seat system for passenger vehicles, in particular for aircraft.

With regard to journeys of extended length which may arise for passengers in specific vehicles, in particular aircraft or ferries, the aim is to configure the seat components of the seat systems such that a particularly high level of comfort is produced for the passenger. It is, therefore, usual for specific seat components to provide the possibility of adjusting the position, so that the passenger is able to adapt these components, namely the backrest and the armrests, to his or her personal requirements. It is also usual to provide the passenger with the ability to put items down, in the form of a table part. Due to the relatively small amount of space available in cabins of such vehicles, however, it is necessary to provide the table part with a capacity for being stowed, so that the table part only requires a corresponding cabin space in an approximately horizontal operative position, but during non-use may be moved from the operative position into a stowed position, in which it represents no restriction to the free space available to the relevant seat system.

The resulting advantages for the passenger of the possibility being provided of using the table part, however, have to be balanced out, from the point of view of the passenger, with the drawback that the passenger is forced to actuate corresponding control devices and/or adjusting devices in order to effect the transfer of the table part between the positions provided.

With regard to this, the object of the invention is to provide a releasing device which permits the passenger particularly simple and comfortable use of the table part.

According to the invention, this object is achieved by a releasing device, which in its entirety has the features of claim 1.

Accordingly, the particularity of the invention is that the movement of a position-adjustable armrest is utilized as a control function in order to activate a locking device securing the table part in the stowed position, such that the table part is released for transferring into the operative position. The actuation is exceptionally simple and comfortable for the passenger, as the position-adjustable armrest to be moved for the control function is placed within immediate reach of the passenger- and thus may be reached easily and comfortably.

Preferably, the locking device comprises a bolt member which may be moved between a locked position in which it is able to be latched to the table part located in the stowed position and a position of release, a pretensioning device being provided which pretensions the bolt member for movement into the locked position and a linking device being present which converts the movement of the position-adjustable armrest, when it is transferred into a position of release, into a movement of the bolt member carried out counter to the pretensioning, into the position of release thereof. As the bolt member is normally pretensioned in the locked position, firstly there is the possibility of a structurally simple construction of the linking device, as said linking device only has to generate an adjusting movement counter to the pretensioning force in one direction, namely toward the position of release. Secondly, due to the pretensioning into the locked position, the table part is automatically latched in the stowed position.

In particularly advantageous embodiments, the coupling device has a pulling member extending between the locking device and the position-adjustable armrest, via which a tensile force may be transmitted to the bolt member, which pulls said bolt member counter to the pretensioning from the locked position into the position of release. The use of a pulling member allows a particularly simple, operationally reliable and lightweight construction of the linking device.

The last-mentioned advantages are, in particular, provided when a Bowden cable is provided as a pulling member.

In this case, the arrangement may be such that at least one spring arrangement acting between the sheath and the core of the Bowden cable generates the pretensioning force which controls the bolt member of the locking device, usually into the locked position. In this connection, a particularly space-saving construction results.

In preferred embodiments, a coupling device is present as a component of the linking device between the core of the Bowden cable and a support lever of the armrest moved during the adjustment of the position of the armrest. By a corresponding design of this coupling device, different desired path lengths of the adjusting movements may be achieved which are covered by the support lever of the armrest during the adjusting movement thereof and/or by the core of the Bowden cable for activating the locking device.

In a particularly advantageous embodiment, the coupling device comprises a drive element which may be displaced in a straight line during the adjustment of the position of the armrest and comprises a pivotable toggle lever, the one lever arm thereof being pivotable by the displacement motion of the drive element and, via the other lever arm thereof, a tensile force being able to be transmitted to the core of the Bowden cable during the pivoting movement carried out by the drive element. In such embodiments, different desired path lengths may also be implemented by the choice of the respective lengths of the lever arms of the toggle lever.

In a particularly advantageous manner, the positions of the drive element and associated lever arm of the toggle lever may be arranged in a relationship to one another, such that the drive element in the course of its displacement motion passes over the lever arm and releases said lever arm for a pivoting movement independent of the drive element, effected by the pretensioning acting on the core of the Bowden cable.

The invention may be used particularly advantageously in seat systems in which a row of seats is provided with seats located adjacent to one another, the table part being attached to the backrest of a central seat located between two seats, such that it is secured by the locking device in a stowed position located on the support region of the backrest and when the locking device is activated may be pivoted into its operative position remote from the support region, in which it forms an at least approximately horizontal table surface.

In such rows of seats, in which a central seat is located between two further seats and all of these seats have the same seat width defined by the armrests, which for example corresponds to the seat width of economy class in civil aviation, there is the particularly advantageous possibility of making out of a group of three seats a group of two, having only two seats, the correspondingly larger seat width thereof corresponding to standard business class size. Such a conversion may take place such that the position of both armrests adjacent to the central seat may be adjusted between a first position which provides seat widths which are respectively the same as one another for the three adjacent seats and a position of release, in which these armrests are brought closer to one another for increasing the seat width of the two outer seats, the locking device of the releasing device according to the invention being able to be activated depending on the transfer of at least one of these armrests into the position of release. As a result it is achieved that when changing from standard economy class size to standard business class size, the table part is automatically unlocked so that it may be used in its operative position between business class seats adjacent thereto at the side, for example as a cocktail table.

In this connection, a particularly advantageous design results when the position of the position-adjustable armrests may be adjusted such that in the position of release they extend along the approximately horizontal side edges of the table part located in the operative position.

A particularly high degree of operational comfort results when, for the table part pivotably mounted on the seat structure, a mechanical drive is provided, which generates an adjusting force on the table part, which attempts to pivot the table part secured in the stowed position when activating the locking device in the direction of the operative position. When actuating the position-adjustable armrest, for example when changing from economy class to business class, not only an automatic unlocking of the table unit takes place, therefore, but also the introduction of a pivoting movement of the table part takes place in the direction of the operative position.

The invention is explained in detail hereinafter with reference to an embodiment shown in the drawings, in which.

Figure 4:
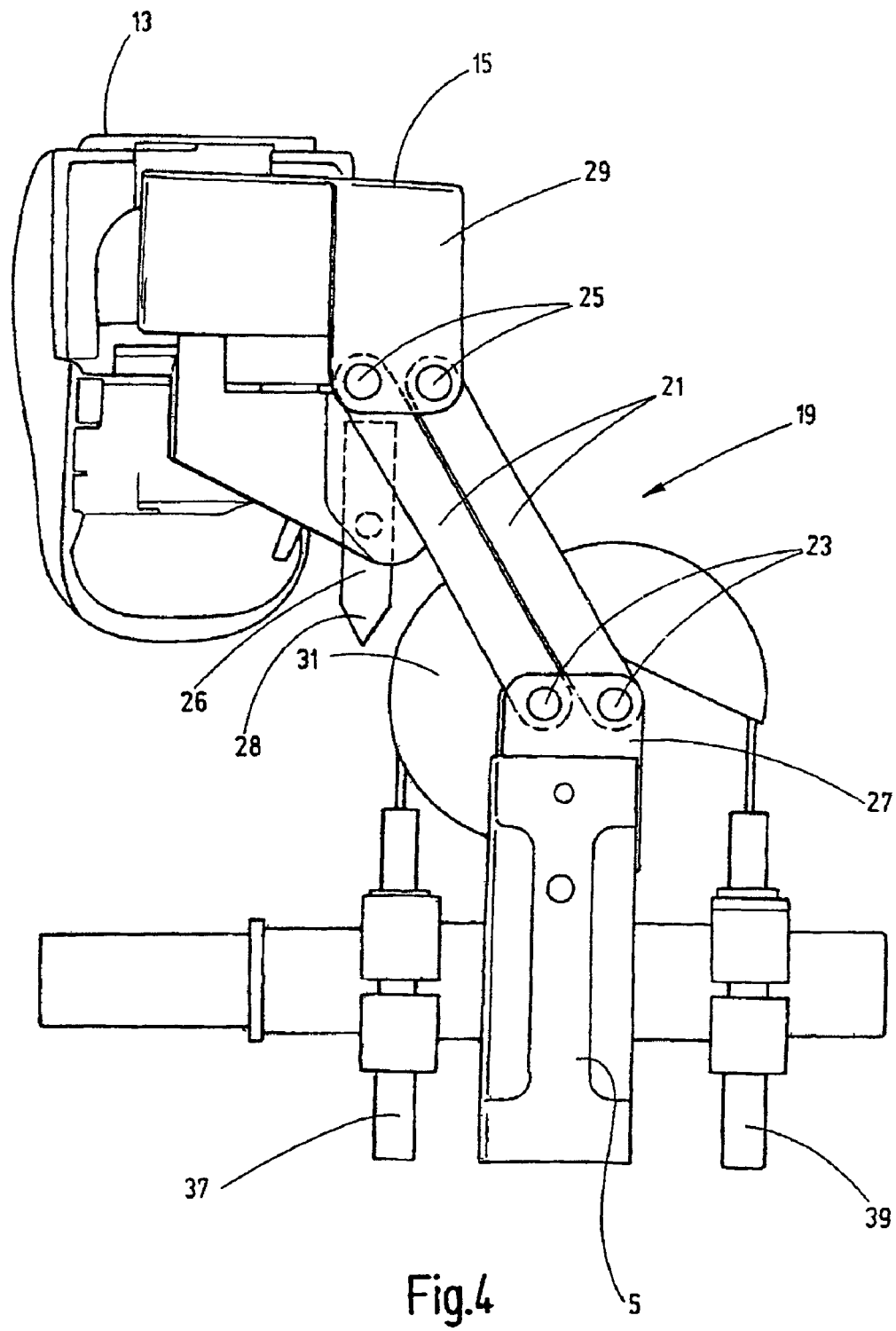
FIG. 4 shows a schematic, simplified rear view in larger scale compared to FIG. 3, of a position-adjustable armrest of the seat system of FIG. 3 with the associated position adjusting device.
Figure 5:
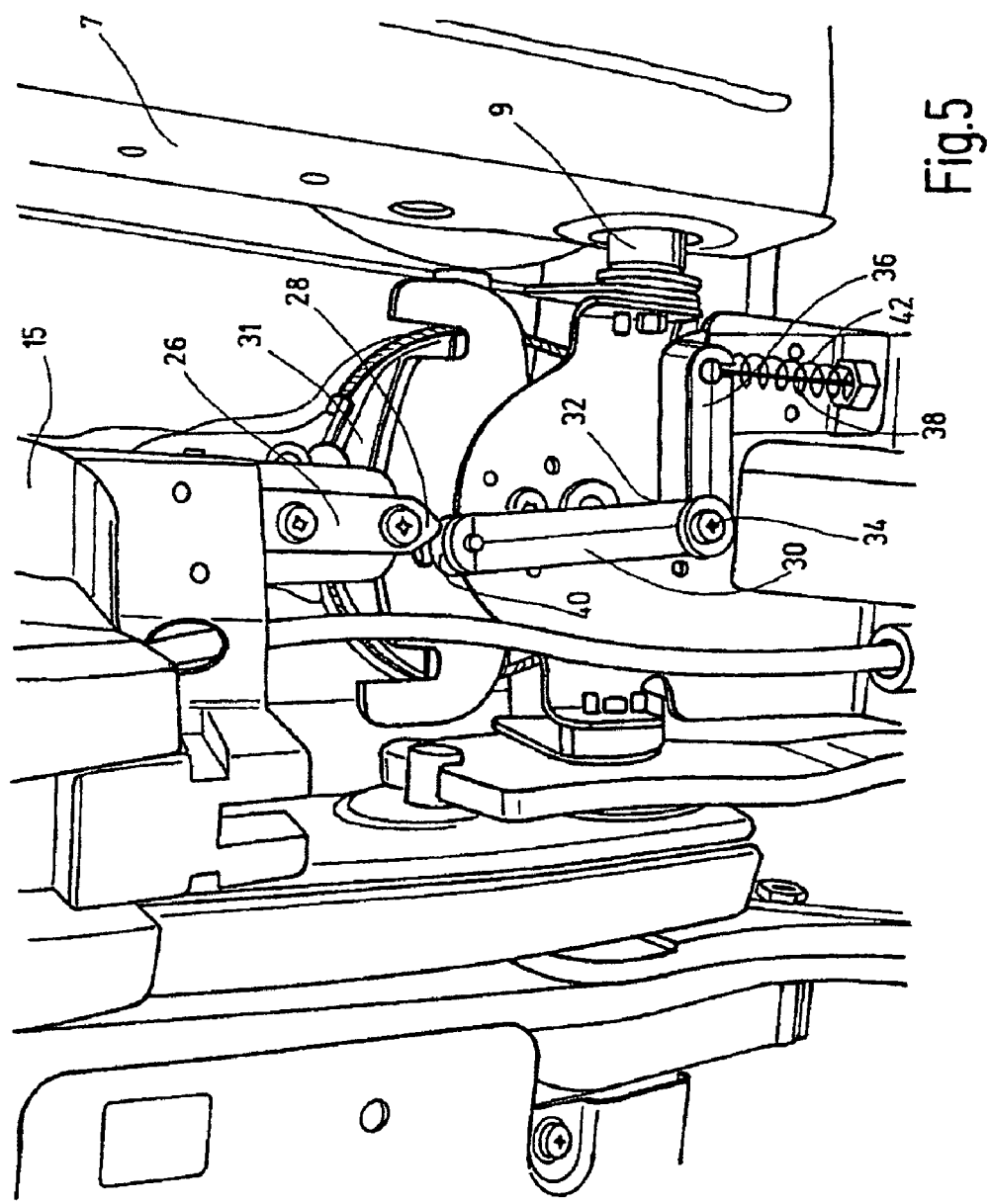

FIG. 5 shows a perspective and fragmented front view, of the position adjusting device shown in FIG. 4 and of a coupling device as a component of the releasing device according to the invention, the coupling device being shown in an operating position which is produced during the adjusting movement of a position-adjustable armrest into the position of release, and FIG. 6 shows a view corresponding to FIG. 5, the coupling device being shown in the operating state which is produced after carrying out the adjusting movement of the adjustable armrest into the position of release.

Figure 1:
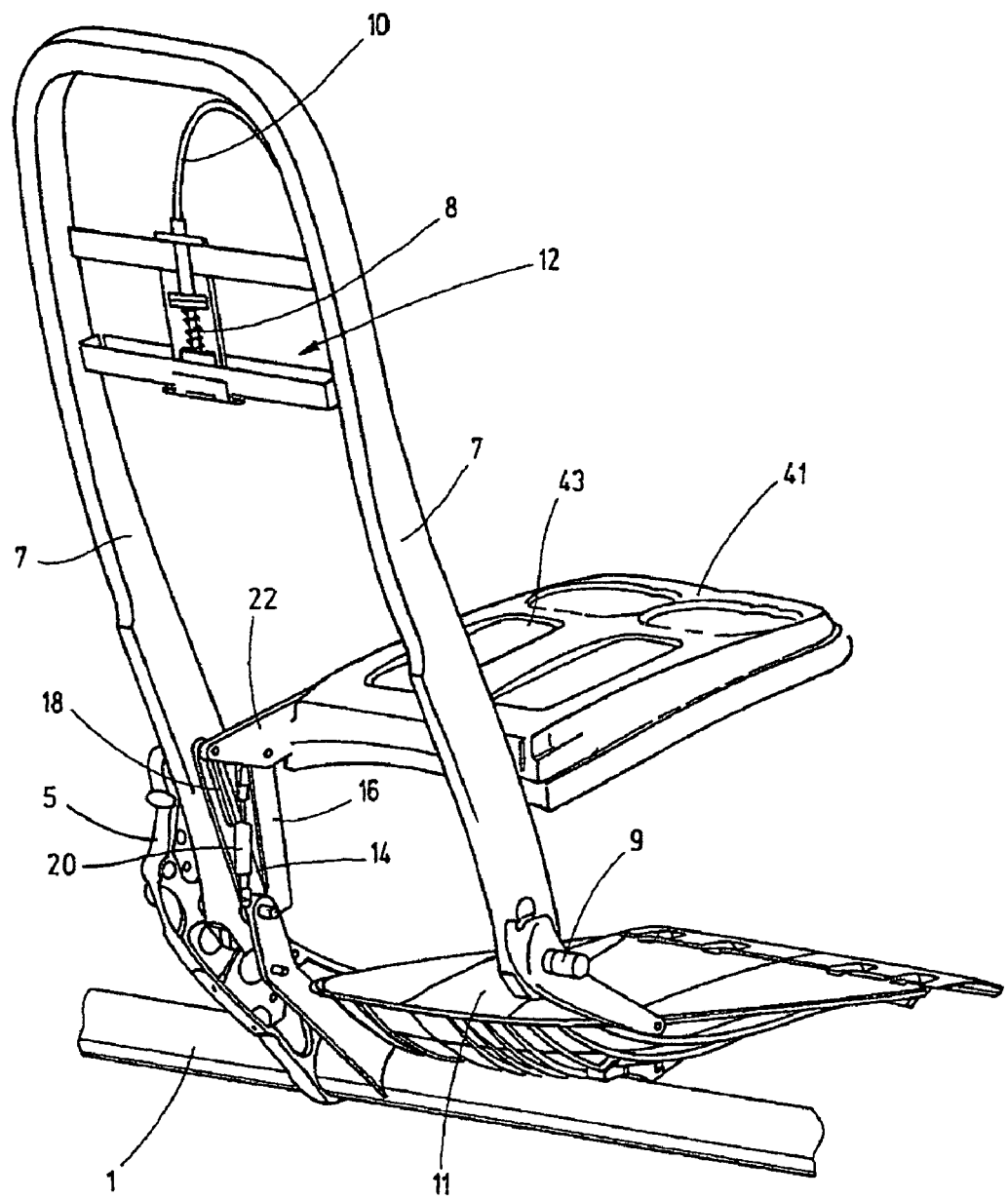
FIG. 1 shows a perspective oblique view of only a few structural elements which are essential for understanding the invention of a seat system provided with an embodiment of the releasing device according to the invention, a table part being shown in its operative position.
Figure 3:
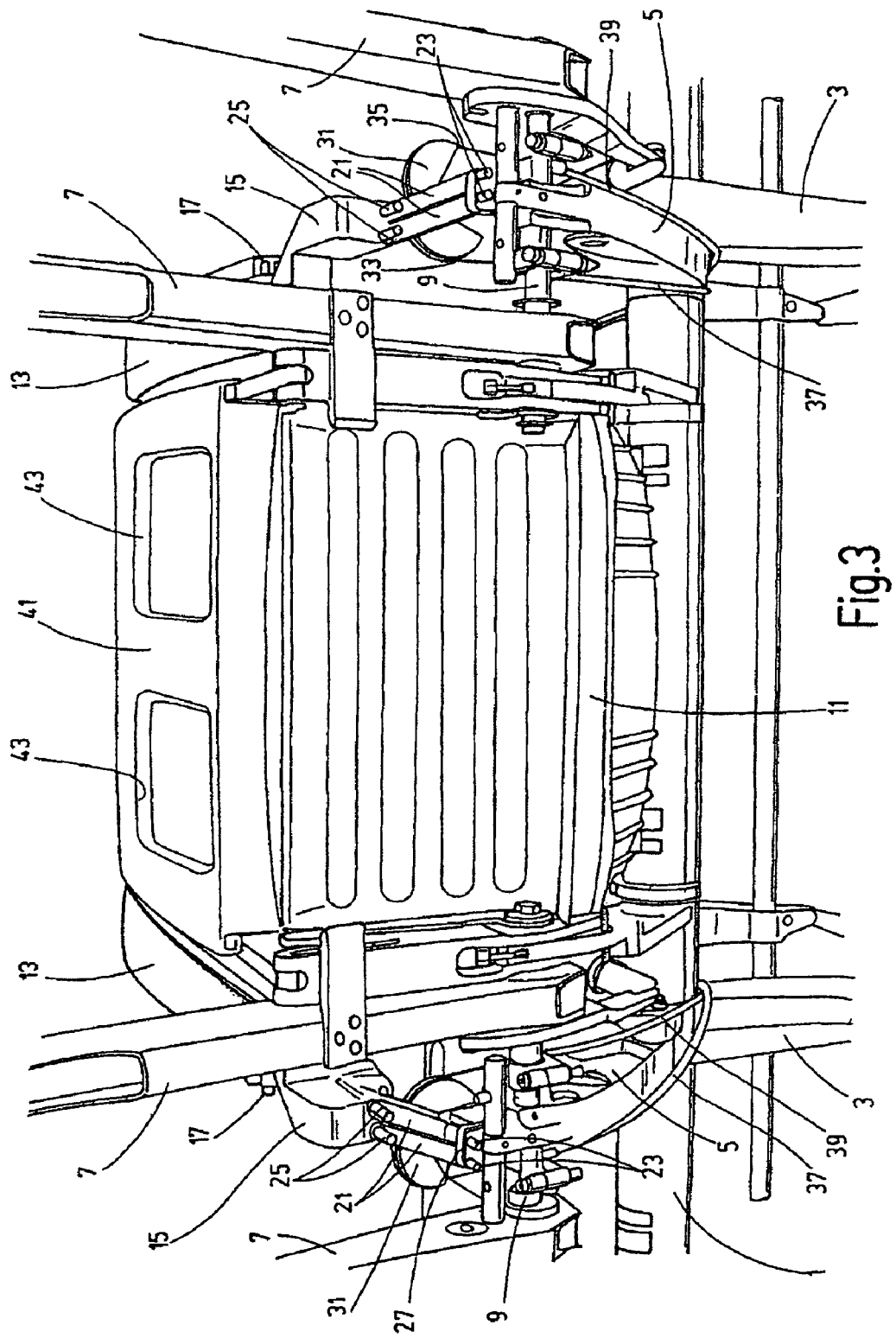
FIG. 3 shows a very schematic, simplified and perspectively illustrated rear view of only the central region of a row of seats, provided with an embodiment of the releasing device according to the invention, only the essential structural elements being shown partially fragmented and without cladding.

In FIGS. 1 and 3 a table part 41 is respectively shown in its operative position, in which it forms with one of its large surfaces an approximately horizontal table surface 43 (relative to the vertical installed position of the seat system). This extends forward, proceeding from the region of a backrest, of which only the backrest frame is shown with uprights 7, between the armrests 13 (FIG. 3) in the direction of travel (flight direction), the longitudinal extension of the table surface 43 in the example shown extending as far as the front end region of the armrests 13. From the operative position shown in FIGS. 1 and 3, the table part 41 may be transferred into a stowed position, in which, located between the uprights 7 of the backrest, with its large surface opposing the table surface 43, which is configured as a cushion surface, it forms a part of the support region of the backrest.

Figure 2:
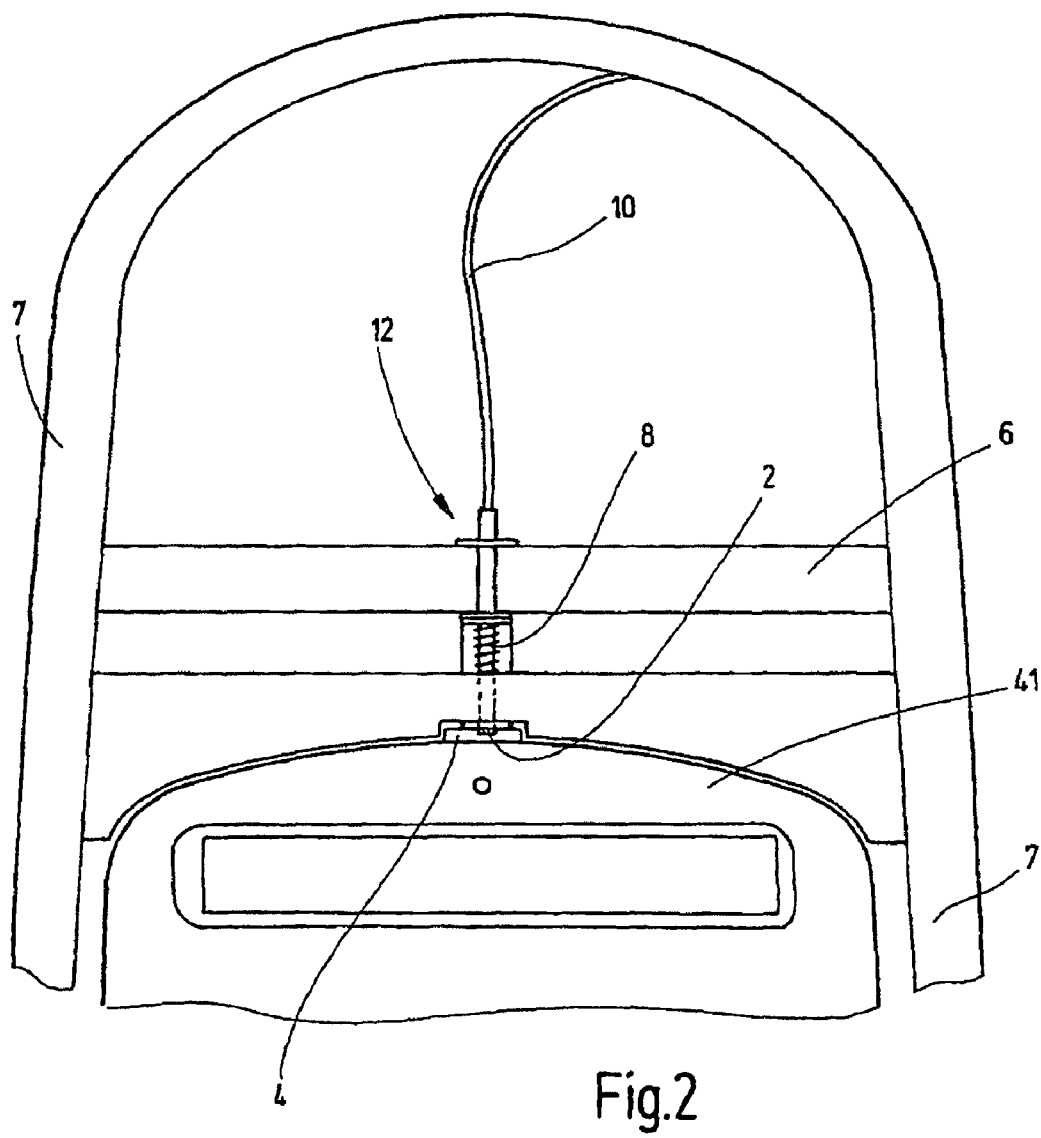
FIG. 2 shows a partial front view, shown enlarged and fragmented relative to FIG. 1, of only the upper region of the backrest structure, the table part being secured by means of a locking device in its stowed position.

In the stowed position shown in FIG. 2, a pin-like bolt member 2 which is longitudinally displaceable between the locked position and position of release is shown in its locked position pushed forward, in which it is in engagement with a catch 4 located at the front end edge of the table part 41, for securing the table part 41 in the stowed position. The bolt member 2 which forms part of a locking device denoted as a whole by 12, is displaceably mounted on a cross member 6 which connects the uprights 7 and is pretensioned by means of a helical spring 8 in the direction of the locked position. From the locked position, the bolt member 2 may be pulled back by means of a Bowden cable 10 counter to the force of the spring 8. The Bowden cable 10 forms a component of a linking device which converts the movement of a longitudinally adjustable armrest 13 into a position of release into a movement of the bolt member 2 carried out counter to the pretensioning into its position of release.

For its adjusting movements between the stowed position and the operative position, the table part 41 is coupled via a lever mechanism 14 to the fixed seat structure, i.e. to the structural element 5 and the supporting bar 1, which is formed from a pair of levers consisting of two articulated levers 16 and 18 and to which a mechanical drive in the form of a gas pressure spring 20 is associated. By selecting the lever lengths as well as the points of articulation on a table support plate 22, the lever mechanism 14 is designed such that the gas spring 20, when the table part 41 is located in the stowed position, generates a pivoting moment, which attempts to pivot the table part 41 in the direction of the operative position. As a result, the table part 41 when activating the locking device 12 into the released state is initially pivoted downwards as far as an intermediate position, in which intermediate position the lever mechanism 14 reaches an over-centered state. From this intermediate position, the table part 41 is again pivoted toward the operative position, the gas spring 20, after moving over the over-centering, generating a pivoting moment which pivots the table part 41 into the operative position.

FIG. 3 shows the table part 41 in the operative position, which is defined by a stop device, not shown, the position-adjustable armrests 13 extending in their position of release along the side edges of the table part 41 located in the operative position.

FIG. 3 shows the central region of a row of seats with three seats located adjacent to one another, a supporting bar 1 extending in the transverse direction of the seat, forming a main component of the support structure, which is held on stands on a cabin floor, not shown, via stand legs 3. The backrest uprights 7 are pivotably mounted on tilt axes 9 for adjusting the backrest inclination, on structural elements 5 connected to the support bar 1. A seat shell of the central seat mounted on the supporting structure is denoted by 11.

Of the armrests belonging to the row of seats, only the position-adjustable armrests 13, adjacent to the central seat, are visible in the drawings. These armrests 13 are shown in FIG. 3 in an adjusted position, which corresponds to the position of release and in which they have the shortest distance from one another measured in the transverse direction of the seat. This adjusted position, which is denoted in the present text as "position of release", corresponds to the operating state of the row of seats in which the seat width of both outer seats is increased, i.e. a row of seats originally with three seats being converted into a row of seats with two seats, between which no central seat is located, but a clearance which may be otherwise used.

Each position-adjustable armrest 13 is arranged on an armrest support 15, which has the form of an arm bent at right angles, on the one end region thereof the actual armrest being mounted on a folding joint 17 such that it may be folded up from an approximately horizontal operative position toward the backrest (not shown).

The armrest support 15 forms at its end region remote from the folding joint 17 part of a parallelogram guide denoted as a whole by 19, which, see in particular FIG. 4, has two articulated levers 21 configured the same, which at their lever ends respectively are pivotably mounted on parallelogram pivot axes 23 on the structure side and parallelogram pivot axes 25 on the armrest side. The pivot axes 23 on the structure side extend in a common horizontal plane and in the longitudinal direction of the seat. The pivot axes 25 on the armrest side also extend in a common horizontal plane parallel to the pivot axes 23 on the structure side, the pivot axes 25 on the armrest side having the same distances from one another as the pivot axes 23 on the structure side. The pivot axes 23 on the structure side are located on a bearing part 27 of the fixed structural element 5, whilst the pivot axes 25 on the armrest side are located on an end piece 29 of the armrest support 15, in the end piece 29 a downwardly open recess movably receiving the upper end regions of the articulated levers 21. As may be seen from FIG. 4, a drive lever 26 downwardly projecting over the lower edge is fixedly attached to the lower edge region of the end piece 29.

FIG. 4 shows the parallelogram guide 19 in the state corresponding to the first position of the armrests 13, in which the articulated levers 21 in the viewing direction according to FIG. 4, are inclined anticlockwise to the left from the vertical position. As may be seen clearly from FIG. 4, the articulated levers 21 with the dimensioning shown in FIG. 4 (width of the articulated levers 21) and the axial spacings of the pivot axes 23 and 25 in the position shown in FIG. 4, bear respectively against one another at the side, so that the parallelogram guide 19 is automatically locked against a further anticlockwise pivoting movement.

If the armrest 13 shown in FIG. 4 is transferred from the first position into the position of release, the parallelogram guide 19 now being pivoted clockwise, a slightly arcuate displacement motion of the drive lever 26 results, to the right in FIG. 4.

FIGS. 5 and 6 are, in contrast to FIGS. 3 and 4, not rear views but front views. In other words, when transferring the position-adjustable armrest 13 from the first position into the position of release, in the view of FIGS. 5 and 6, a displacement motion of the drive lever 26 in FIGS. 5 and 6 takes place from right to left. FIG. 5 shows a state in which during the adjusting movement of the armrest 13 toward the position of release, the drive lever 26 has moved from an initial position on the right side, to an approximately central intermediate position to the left. FIG. 6 shows the state in which the armrest 13 has reached its position of release, the drive lever 26 being displaced into its end position on the left side.

As may be seen clearly from FIGS. 5 and 6, the drive lever 26 cooperates with its front end region 28 provided with chamfers, with a lever arm 30 of a toggle lever 32, which at 34 is pivotably mounted on a support fixed to the structure about an axis extending in the longitudinal direction of the seat. With its second lever arm 36, the toggle lever 32 is connected to the core 38 of the Bowden cable 10. The lever arm 30 of the toggle lever 32 provided for actuation by the drive lever 26 has at the lever end a roller 40 towards which the drive lever 26 with its chamfered end 28 approaches during the displacement motion, which results from adjusting the position of the armrest 13. FIG. 5 shows, as mentioned above, an intermediate state in which the end 28 of the drive lever 26 is in contact with the roller 40, and has pivoted the toggle lever 32 anticlockwise. The pivoted position of the toggle lever 32 thus reached, which is transmitted via the lever arm to the core 38 of the Bowden cable 10, has the result that the Bowden cable 10 acting as a pulling member, activates the locking device 12 of the table part 41, such that the bolt member 2 is pulled back against the pretensioning force of the spring 8 from the locked position into the position of release. As a result, via the lever mechanism 14, the table part 41 is pivoted out of the stowed position.

FIG. 6 shows the state in which the position-adjustable armrest 13 has reached its end position in the position of release, the drive lever 26 after it has moved over the roller 40 on the lever arm 30, being located in its end position on the left side in FIG. 6. By the release of the toggle lever 32 thus carried out, the bolt member 2 returns automatically into its locked position.

In the locked position, the toggle lever 32 is in the central position shown in FIG. 6, which is flexibly secured by a compression spring 42 acting counter to the pretensioning force of the spring 8 but generating a smaller spring action, which is tensioned between the lever arm 36 and thus the core 38 of the Bowden cable 10, and the sheath thereof. If, therefore, by the armrest 13 being transferred again from the position of release into its first position, the drive lever 26 is displaced to the right from the end position on the left side shown in FIG. 6, it again passes over the roller 40 on the lever arm 30 of the toggle lever 32, said toggle lever being pivoted slightly clockwise. This pivoting movement takes place counter to the compression spring 42 holding the core 38 of the Bowden cable 10 taut and having a small spring force. As a result, the coupling device formed from the toggle lever 32 and the drive lever 26, is again in its initial state and ready for a subsequent activation of the locking device 12 when transferring the position-adjustable armrest 13 from the first position into the position of release.

By means of a drive connection between the parallelogram guides 19 of the position-adjustable armrests 13, an adjusting movement of an armrest 13 leads to the corresponding adjusting movement of the other armrest 13. In the present example, on each parallelogram guide 19 a cable drum-like coupling body 31 is connected to the parallelogram guide 19 such that the coupling body 31 is able to be rotated by the pivoting movements of the parallelogram guide 19. Each coupling body 31 has on both sides of the centre of rotation of the pivoting movements of the parallelogram guide, and thus the rotational movement of the coupling body 31, one respective point of application for pulling members of a cable pull arrangement. The cable pull arrangement provided as a drive connection also has Bowden cables, as is the case with the linking device for activating the locking device 12. These Bowden cables 37 and 39 are guided between the coupling bodies 31 of both parallelogram guides 19, such that an adjusting movement of an armrest 13 leads to a synchronous adjusting movement of the other armrest 13, the coupling body 31 of the respective other armrest being rotated therewith by the same rotational angle, but in the opposing rotational direction. In combination with the linking device of the releasing device according to the invention, it is consequently achieved that an adjusting movement of an armrest 13 into the position of release causes both the seat width alteration of both outer seats of a group of three and the activation of the locking device 12 of the table part 41.

The invention claimed is:

1. A seat system for passenger vehicles, comprising:
a seat row having adjacent seats including a central seat with a backrest arranged between two side seats, and a position-adjustable armrest,
a table part being attached to the backrest of the central seat, the table part being moveable between an operative position and a stowed position, wherein in the stowed position the table part is located remote from a support region of the backrest and forms at least an approximately horizontal table surface, and in the stowed position the table part is located on the support region of the backrest of the central seat; and
a locking device being configured to secure the table part in the stowed position, the table part being pivotable from the stowed position into the operative position when the locking device is activated, and the locking device being activated by an adjusting movement of at least the position-adjustable armrest for releasing the table part from the stowed position and transferring the table part into the operative position.

2. The seat system as claimed in claim 1, further comprising a linking device connecting the position-adjustable armrest to a bolt member of the locking device, whereby the bolt member moves with movement of position-adjustable armrest; the bolt member of the locking device moving between a locked position where the bolt member is latched to the table part while located in the stowed position and a release position where a pretensioning device pretensions the bolt member in a direction toward the locked position; and where the linking device converts movement of the position-adjustable armrest, when the position-adjustable armrest is moved into a position of release, into a movement of the bolt member counter to that of the direction of pretensioning and into the release position.

3. The seat system as claimed in claim 2, wherein the linking device has a pulling member extending between the locking device and the position-adjustable armrest, via which a tensile force is transmitted to the bolt member, which pulls the bolt member counter to the pretensioning from the locked position into the position of release.

4. The seat system as claimed in claim 3, wherein a Bowden cable is provided as a pulling member.

5. The seat system as claimed in claim 4, wherein at least one spring arrangement acting between a sheath and a core of the Bowden cable generates the pretensioning force which controls the bolt member of the locking device, usually into the locked position.

6. The seat system as claimed in claim 5, wherein the linking device comprises a coupling device that is provided for coupling the core of the Bowden cable and a support of the position-adjustable armrest moved during the adjustment of the position of the position-adjustable armrest.

7. The seat system as claimed in claim 6, wherein the coupling device comprises a drive element being displaced in a straight line during the adjustment of the position of the position-adjustable armrest, and comprises a pivotable toggle lever, the one lever arm thereof being pivotable by the displacement motion of the drive element and, via the other lever arm thereof, a tensile force being able to be transmitted to the core of the Bowden cable during the pivoting movement effected by the drive element.

8. The seat system as claimed in claim 7, wherein positions of the drive element and the associated lever arm of the toggle lever are arranged in a relationship to one another such that the drive element in the course of the displacement motion passes over the lever arm and releases the lever arm for a pivoting movement independent of the drive element, effected by the pretensioning acting on the core of the Bowden cable.

9. The seat system as claimed in claim 1, further comprising a second position-adjustable armrest; wherein the position of both position-adjustable armrests adjacent to the central seat may be adjusted between a first position which provides seat widths which are respectively the same as one another for the three adjacent seats and a position of release, in which the position-adjustable armrests are brought closer to one another for increasing the seat width of the two outer seats and wherein the locking device is activated depending on the transfer of at least one of the position-adjustable armrests into the position of release.

10. The seat system as claimed in claim 9, wherein the position-adjustable armrests in the position of release extend along the approximately horizontal side edges of the table part located in the operative position.

11. The seat system as claimed in claim 1, wherein for the table part pivotably mounted on the seat structure, a mechanical drive is provided, which generates an adjusting force on the table part, which pivots the table part secured in the stowed position when activating the locking device in the direction of the operative position.

* * * * *